United States Patent

[11] 3,634,028

[72] Inventor Reinhard Hohne
    Neu Isenburg, Germany
[21] Appl. No. 677,157
[22] Filed Oct. 23, 1967
[45] Patented Jan. 11, 1972
[73] Assignee Metallgesellschaft Aktiengesellschaft
    Frankfurt am Main, Germany
[32] Priority Oct. 27, 1966
[33] Germany
[31] M 71460

[54] PROCESS FOR REMOVING SULFUR FROM GASES
    6 Claims, 2 Drawing Figs.
[52] U.S. Cl. .................................................. 23/2 S,
    23/225, 55/73, 252/411, 252/444
[51] Int. Cl. .................................................. B01d 53/34,
    B01d 53/16
[50] Field of Search .................................... 23/2, 2.1, 3,
    3.1, 225, 226; 55/73, 74; 252/411, 421, 444, 445

[56] References Cited
    UNITED STATES PATENTS
| | | | |
|---|---|---|---|
| 3,284,158 | 11/1966 | Johswich .................. | 23/225 X |
| 1,430,920 | 10/1922 | Mittasch et al. ........... | 23/3 |
| 1,479,852 | 1/1924 | Engelhardt ................ | 23/3 |
| 3,502,427 | 3/1970 | Johswich .................. | 23/2 |

Primary Examiner—Earl C. Thomas
Attorney—Burgess, Dinklage & Sprung

ABSTRACT: Use of activated carbon; having a steep absorption isotherm, that is carbon having a surface area of about 1,200 to 1,500 square meters per gram, a most frequent (median) pore radius of about 4 to 12 angstroms, a micropore (less than 100-angstrom diameter) volume of about 0.8 cubic centimeters per gram, and a bulk density of up to about 350 grams per liter, as adsorbent for sulfur in sulfur-containing gases; and to regeneration of the adsorbent by treatment thereof with hot, at least about 280° C., inert gases.

FIG. I.

PROCESS FOR REMOVING SULFUR FROM GASES

This invention relates to the removal of sulfur from gases. It more particularly refers to the removal of sulfur from gases by adsorption and to the regeneration of the adsorbent to spring the sulfur therefrom.

Sulfur is present in many gases. In the usual situation it is necessary or at least most desirable to remove such sulfur from the gases before further processing or exhaustion to the atmosphere. Exemplary of the gases from which sulfur should be removed are those obtained by the wet purification of gases obtained by the pressure gasification of solid carbonaceous fuels and by the gasification of oil; exhaust gases obtained in the processing of pyrites; exhaust gases of the Claus process and of the gasification of hydrocarbons; fuel gases obtained by the pressure gasification of solid carbonaceous fuels; and natural gas.

Various gas purification processes are known which involve, e.g., a reaction of $H_2S$ with $SO_2$ or of $H_2S$ with air on activated carbon to produce sulfur, possibly in the presence of accelerators. The activated carbon may become loaded with sulfur to more than 100 percent of its own weight. Processes of removing sulfur from gases through the use of activated carbon adsorbents have been known for decades. However these processes generally suffer from difficulties involved in the regeneration of activated carbon.

The regeneration of sulfur-laden activated carbon has previously been effected by extraction with strong hydroxide solutions, or with solutions of ammonium polysulfide, or with organic solvents such as carbon disulfide, toluene, xylene, or by desorption with superheated steam. Part of the superheated steam reacts with the sulfur to form $H_2S$ and $SO_2$ so that the sulfur structure is loosened up and the release thereof is facilitated. This process is restricted however, to applications in which the acid compounds of sulfur may be discharged into the atmosphere. The vapors can be processed only with great difficulty because their condensation results in the formation of aggressive polythionic acids (Wackenroder liquids). After 10 regenerating cycles, a distinct disintegration of the carbon treated with superheated steam is usually observed.

For this reason, the extraction processes are more widely used. The extract obtained by an extraction with a hydroxide solution is discharged in most cases as sewage. In an extraction process using solutions of ammonium polysulfide, the sulfur is eliminated from the extract by boiling the latter so that the ammonium polysulfide solution can be reused. The process requires a relatively large amount of steam.

Extraction with carbon disulfide involves considerable structural reinforcement of the equipment in order to prevent explosion. Where xylene or toluene are used, conduits which carry the solvent tend to become clogged by precipitated sulfur. This may be due to the fact that certain temperature conditions, which cannot be avoided, cause the formation of sulfur compounds which are difficultly soluble or insoluble in organic solvents. During the extraction, such compounds are also left as a residue on the activated carbon and gradually reduce the quantity of activated carbon and its adsorption capacity. Generally speaking, processes for regenerating sulfur-laden activated carbon by extraction have until now been only partially satisfactory at best.

It is therefore an object of this invention to provide a novel process for the removal of sulfur from gases.

It is another object of this invention to provide a novel adsorption process for the removal of sulfur from gases.

It is a further object of this invention to provide a novel adsorbent for the removal of sulfur from gases.

It is still another object to provide a novel adsorbent regeneration system.

Other and additional objects of this invention will become apparent from a consideration of this entire specification, including the drawing and claims hereof.

In accord with and fulfilling these objects, one aspect of this invention resides in the use of a particular specialized activated carbon as the adsorbent in a process for removing sulfur from gases by adsorption.

The activated carbon adsorbent according to this invention has a steep adsorption isotherm. Its physical characteristics include: a surface area of about 1,200–1,500 cubic meters per gram according to Brunnauer, Emmet and Teller (BET), a most frequent (median) pore radius of about 4–12 A., preferably 6–10 A., and a micropore volume of about 0.8 cubic centimeters per gram (for pores having a radius smaller than 100 A.), as is usually the case with carbon having a bulk density not exceeding 350 grams per liter and preferably amounting to 280–320 grams per liter.

Another aspect of this invention resides in a novel method of regenerating the sulfur-laden adsorbent by passing a hot gas therethrough which gas is substantially inert to both the activated carbon and the sulfur values adsorbed thereby.

Surprisingly it has been found that the sulfur-laden activated carbon used according to the invention violently releases the sulfur into the hot nonreactive gas which is passed through the carbon bed, provided that the inert gas has a temperature of at least about 300° C. This desorption can be continued until a residual loading of less than 15 percent (15 parts sulfur per 100 parts activated carbon on a weight basis) is reached whereupon the activated carbon can be reused.

Since the sulfur-retaining capacity of the activated carbon of this invention surprisingly drops at and above 280° C., the desorbing gas emerging from the regeneration process has a relatively high concentration of sulfur. If sulfur is separated from the inert gas by usual methods, which comprise cooling the gas to about 120° C. and subsequently separating residual sulfur in a cyclone or by a sulfur-removing scrubbing treatment, a high proportion of the sulfur which has been entrained by the desorbing gas can be removed in a technologically and economically satisfactory manner. This is not the case if the desorption is carried out below about 300° C. and if activated carbon is used which has a flat adsorption isotherm, i.e., fine-porous carbon, which results in a high mean reduction of the vapor pressure of the adsorbed sulfur and has in most cases a low sulfur-adsorbing capacity.

The residual loading of the activated carbon which can be obtained by desorption at high temperatures according to this invention, which amounts to about 15 percent or less, is also a known requirement for a considerable or complete removal of sulfur compounds or sulfur from the gases to be purified with the aid of activated carbon.

Whereas it was heretofore feared that activated carbon would not withstand treatment at elevated temperatures, it has surprisingly been found that a treatment of activated carbon having a suitable structure at temperatures up to 500° C. and probably even higher temperatures with hot gases which are nonreactive with respect to activated carbon will result in virtually no reduction of the activity of the carbon. The high desorption temperatures surprisingly do not result in a formation of carbon disulfide (which would mean losses of carbon) because the thermodynamic equilibrium between sulfur and carbon is surprisingly not attained during the desorption in spite of the large activated contact surface.

Understanding of this invention will be facilitated by reference to the drawing in which.

Figure 1:
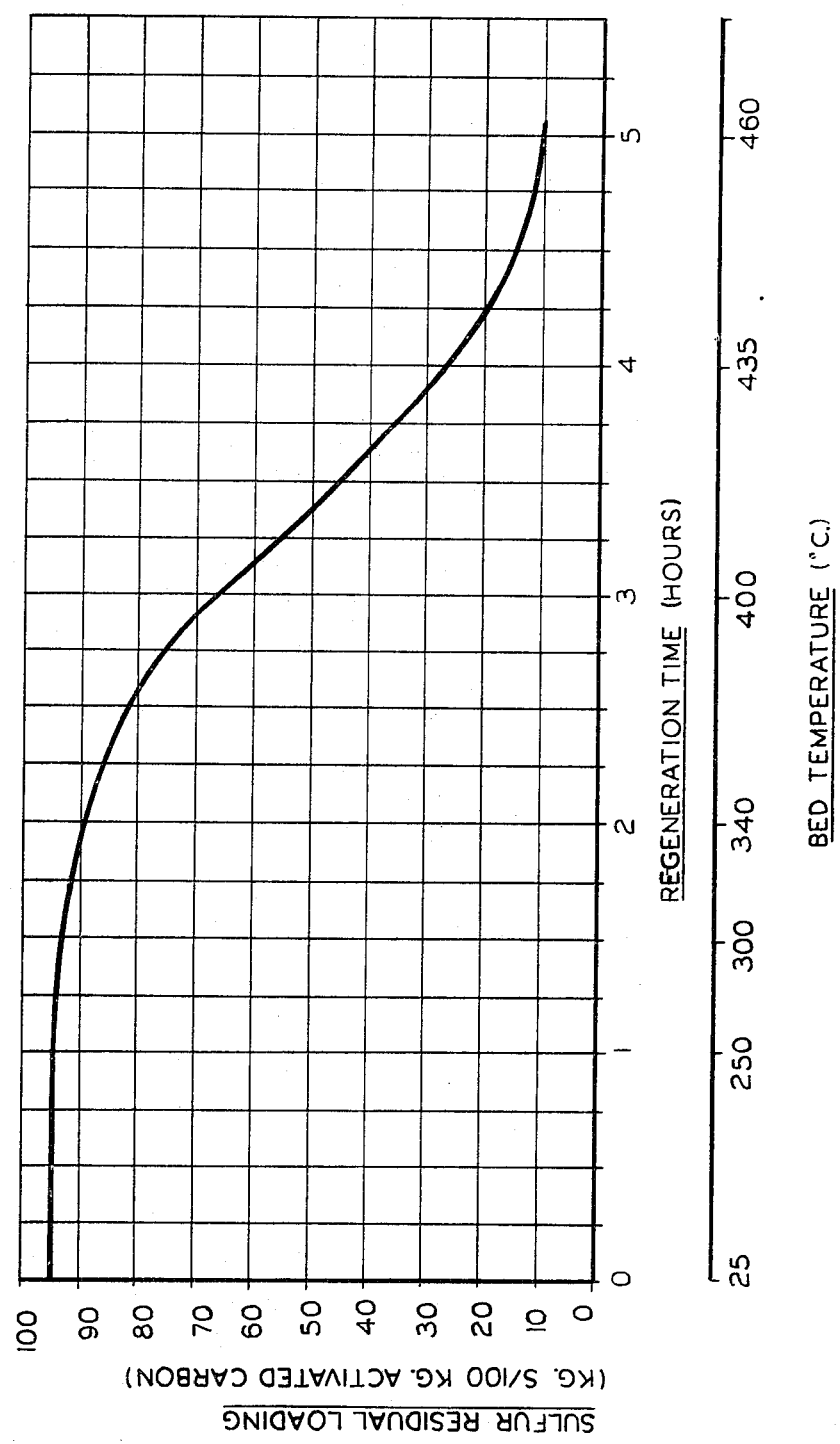
FIG. 1 is a curve showing the desorption of sulfur from activated carbon.

Referring now to FIG. 1, the activated carbon has a bulk density of 310 grams per liter, a most frequent pore radius of 7–9 A. and an internal surface area of 1,200–1,400 square meters per gram. The residual loading of the activated carbon in kilograms of sulfur per 100 kilograms of activated carbon is plotted on the ordinate and the regeneration time and the temperature assumed by the carbon bed when the cold bed of sulfur-laden activated carbon is heated and regenerated by a nitrogen at 500° C. and at a rate of 1 standard cubic meter $N_2$ per kilogram activated carbon and per hour are plotted on the abscissa. Whereas the course of the desorption varies somewhat with the nature of the activated carbon which is employed and the dimensions of the vessel, the desorption course shown in FIG. 1 may be considered typical for the regeneration of sulfur-laden activated carbon according to the invention with hot gases which are nonreactive with respect to carbon and sulfur.

Figure 2:
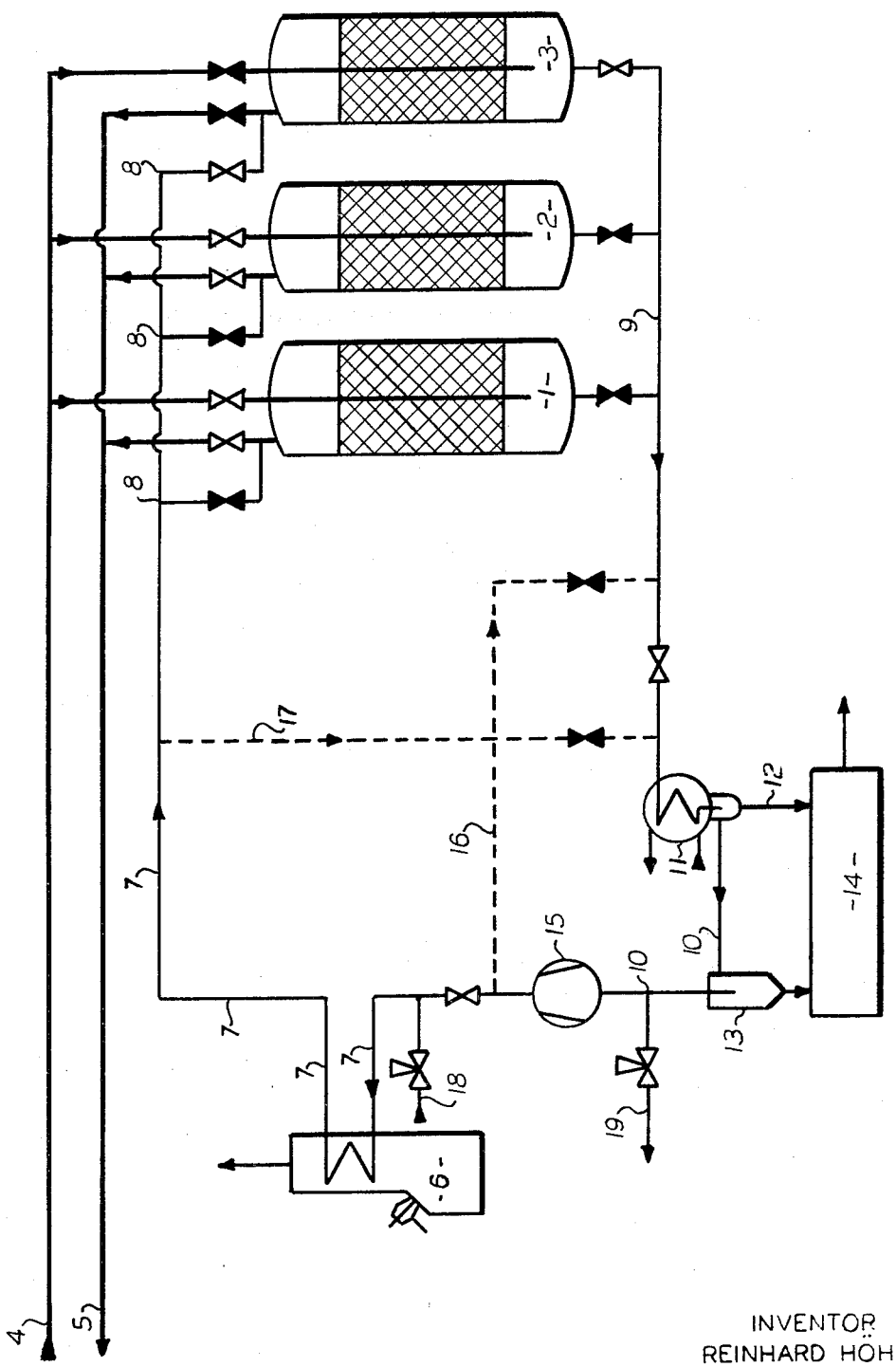
FIG. 2 is a schematic flow diagram of the process of this invention.

Referring now to FIG. 2, the plant comprises three bins 1, 2 and 3, which are filled with activated carbon having the above-mentioned properties. Bins 1 and 2 are included in the path 4, 5 of the gas from which sulfur is to be removed and serve for adsorbing sulfur from said gas. Bin 3 is included in the stream of hot nitrogen, which is conducted through conduits 7, 8, 9 and 10 and serves for regenerating the carbon in the bin 3. To indicate the free gas paths, the open valves included in the conduits are left white and the closed valves in the conduits are represented by solid black. The nitrogen is heated in furnace 6. The sulfur which is entrained by the nitrogen stream passed through the carbon bed is condensed in the cooler 11, which is held at 120° C. The condensed sulfur is removed by the conduit 12. To increase the degree of separation of sulfur, the cooler 11 is succeeded by the cyclone 13. Liquid sulfur is collected in the supply bin 14 and withdrawn from the same as required. The nitrogen, from which sulfur has been removed to a high degree, is sucked by the blower 15 and is recycled to the furnace 6 to be reheated therein.

EXAMPLE OF OPERATION

A plant in accordance with FIG. 2 contained 125 kilograms activated carbon, having the properties required by the invention, in each bin. Exhaust gas composed of 99% $CO_2$ and 1% $H_2S$ by volume was passed through the plant at a rate of 300 standard cubic meters per hour, which means a rate of 150 standard cubic meters of exhaust gas flowing per hour through each of the two activated carbon bins included in the crude gas stream.

Before entering the bins, the exhaust gas was heated to 130° C. and was mixed with such a quantity of air that oxygen slightly in excess of the stoichiometric quantity with respect to $H_2S$ entered the crude gas. The hydrogen sulfide was thus oxidized in the activated carbon beds to form sulfur and small amounts of free sulfur dioxide.

The connection of the bins was changed after intervals of 17.5 hours so that each bin was included in the exhaust gas stream for 35 hours and then in the regeneration cycle for 17.5 hours.

The exhaust gas was thus purified to 2–10 p.p.m. $H_2S$ and 300–500 p.p.m. $SO_2$.

The regeneration was effected over a 17.5 hour period by passing nitrogen, at a temperature of 500° C., through the activated carbon for 13 hours, and through the furnace 6 and the conduit 7, bypassed by the conduits 16, 17 shown in dotted lines in FIG. 2, for additional 4.5 hours so that the nitrogen was passed through the activated carbon in a direction opposite to the direction of flow in the first part of the regeneration treatment.

After every change of connections, the crude gas contained in the bin now to be regenerated was replaced by fresh nitrogen, which was supplied to the plant through valve 18. Valve 19 served as a pressure relief valve. The valves 18, 19 may alternatively be used for a continuous exchange of nitrogen at a relatively high rate. In a further alternative, the blower 15 may be shut down and the nitrogen may be conducted through the regenerating part of the gas-desulfurizing plant instead of recycling all or part of the nitrogen.

As the nitrogen discharged from the regenerating part through valve 19 contains small amounts of elementary sulfur, said nitrogen is suitable introduced into the crude exhaust gas, if this is tolerable, so that the sulfur will be removed from the nitrogen when the latter passes through the activated carbon together with the exhaust gas.

Gases which are nonreactive to a high degree with respect to activated carbon and sulfur include nitrogen as well as methane, inter alia. Methane is often available where sulfur is to be removed from gases. For instance, natural gas may be scrubbed with ethanolamine to remove $CO_2$ and $H_2O$ and $H_2S$ can then be removed from the exhaust gas by the process according to the invention. Alternatively, sulfur may be directly removed from a natural gas which is free of $CO_2$ by the process according to the invention. In both cases, the purified natural gas can be used as a regenerating gas, provided that is consists substantially of methane or a methane-nitrogen mixture. The methane which is separated from the regenerating cycle may be recycled into the crude natural gas or may be burnt in the furnace for heating the regenerating gas.

If special compounds which are nonreactive gases in the process according to the invention, such as benzene, carbon tetrafluoride or inert gases, are available in special cases, such gases or compounds may be used for regenerating purposes.

The use of activated carbon having a steep adsorption isotherm for the purposes according to the invention and the regeneration of such carbon with hot gas may be applied within the scope of the invention to processes other than those described hereinbefore by way of example.

What is claimed is:

1. In the process for removing hydrogen sulfide from gases containing it by reacting said hydrogen sulfide with oxygen or sulfur dioxide on activated carbon to produce sulfur and absorbing sulfur from said gases on said activated carbon, and regenerating said activated carbon; the improvement which comprises using as the adsorbant activated carbon having a mean pore radius of 6 to 10 A., a surface area of about 1,200 to 1,500 square meters per gram, and regenerating said carbon by desorption of sulfur therefrom by passing a stream of hot inert gas therethrough, said regeneration being carried out at a temperature of about 300° to 550° C.

2. The improved process claimed in claim 1, wherein said regeneration is carried out at a temperature of about 380° to 480° C.

3. The improved process claimed in claim 1, wherein said carbon has a bulk density of about 280 to 320 grams per liter.

4. The improved process claimed in claim 1, wherein said inert gas is at least one selected from the group consisting of nitrogen, methane, sulfur-free natural gas and mixtures thereof.

5. The improved process claimed in claim 1, wherein said inert gas having desorbed sulfur therein is cooled to precipitate said sulfur therefrom.

6. The improved process claimed in claim 5, wherein said inert gas, relieved of at least part of its sulfur, is recycled to desorption utilization.

* * * * *